United States Patent
> Drechsel et al.

[15] 3,656,900
[45] Apr. 18, 1972

[54] PROCESS FOR THE CATALYTIC CONVERSION OF SULFUR DIOXIDE TO SULFUR TRIOXIDE WITH PRODUCTION OF SULFURIC ACID

[72] Inventors: Herbert Drechsel; Gustav Rowedder; Karl-Heinz Dorr; Hugo Grimm, all of Frankfurt/Main, Germany

[73] Assignee: Metallgesellschaft AG, Frankfurt (Main), Germany

[22] Filed: June 24, 1970

[21] Appl. No.: 56,052

Related U.S. Application Data

[63] Continuation of Ser. No. 686,249, Nov. 28, 1967, abandoned.

[30] Foreign Application Priority Data

Dec. 3, 1966 Germany..................................M 71879

[52] U.S. Cl....................................................23/168, 23/176
[51] Int. Cl. ................................................................C01b 17/76
[58] Field of Search...........................................23/168, 176

[56] References Cited

UNITED STATES PATENTS

| | | | |
|---|---|---|---|
| 1,789,460 | 1/1931 | Clark | 23/176 |
| 3,404,955 | 10/1968 | Drechsel et al. | 23/168 |
| 3,432,264 | 3/1969 | Bostwick et al. | 23/168 |

Primary Examiner—Oscar R. Vertiz
Assistant Examiner—Charles B. Rodman
Attorney—Burgess, Dinklage & Sprung

[57] ABSTRACT

Process of effecting a catalytic conversion of $SO_2$ - containing gases to produce $SO_3$ and sulphuric acid wherein the $SO_3$ containing gases evolving from at least one conversion tray are split with part passing through cooling and absorption and part bypassing these operations. The gas leaving the absorber is recombined with the bypass stream and then fed to the next contact tray. Cooling of the split gas stream is accomplished to the extent that the gas leaving the absorber has such heat content that when it is combined with the bypass stream, the mixture will be at the proper temperature for feeding to the next contact tray.

10 Claims, 3 Drawing Figures

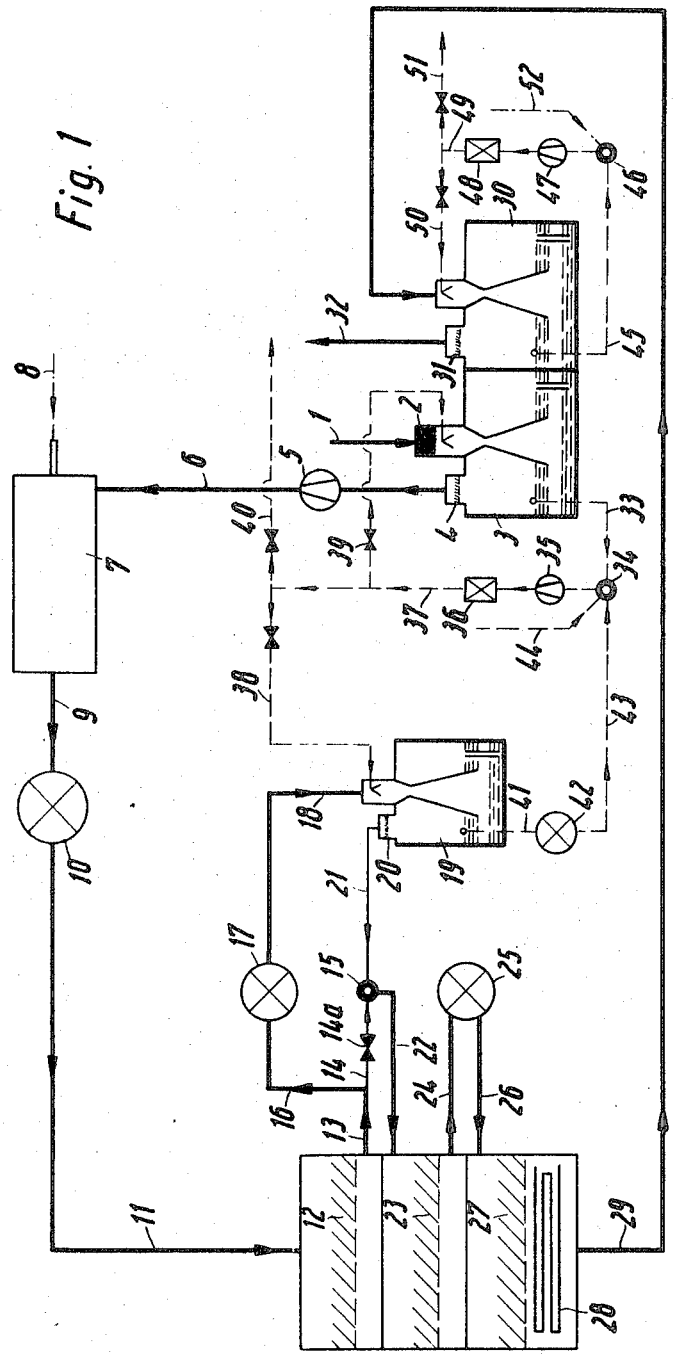

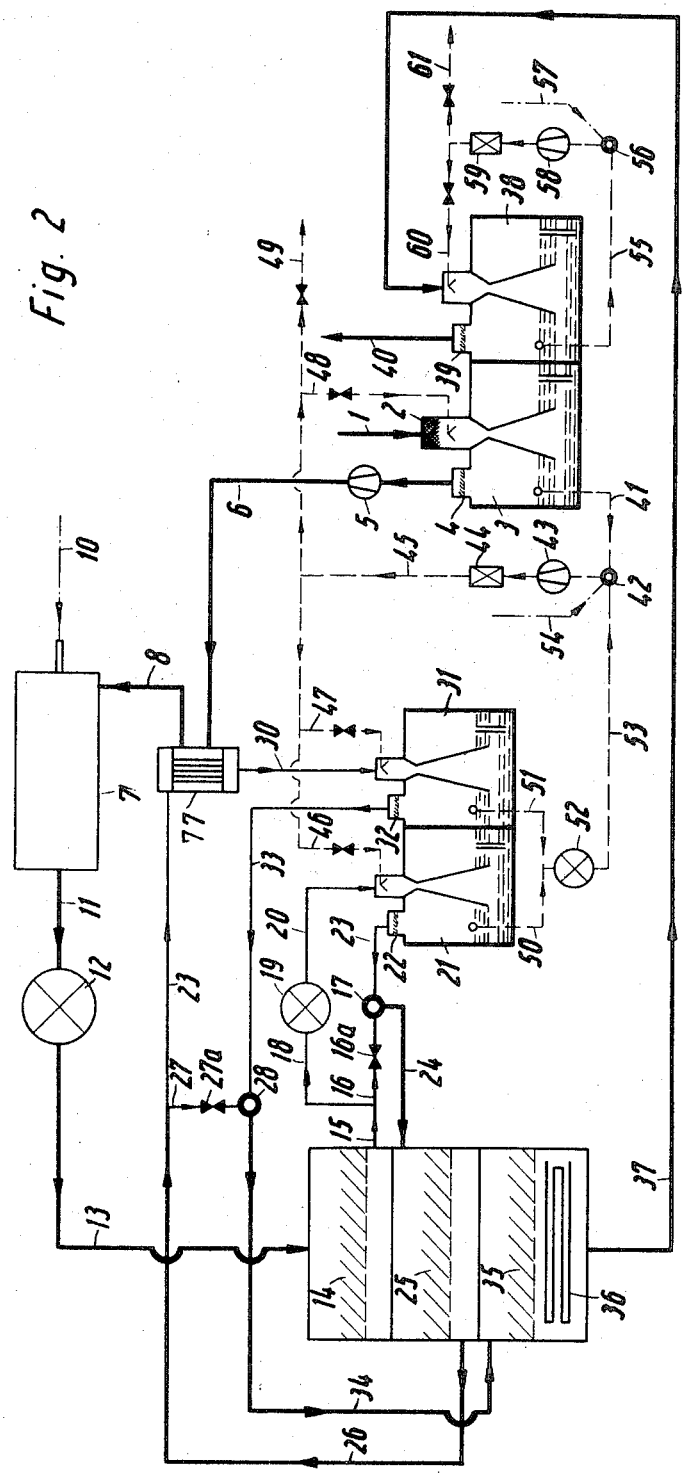

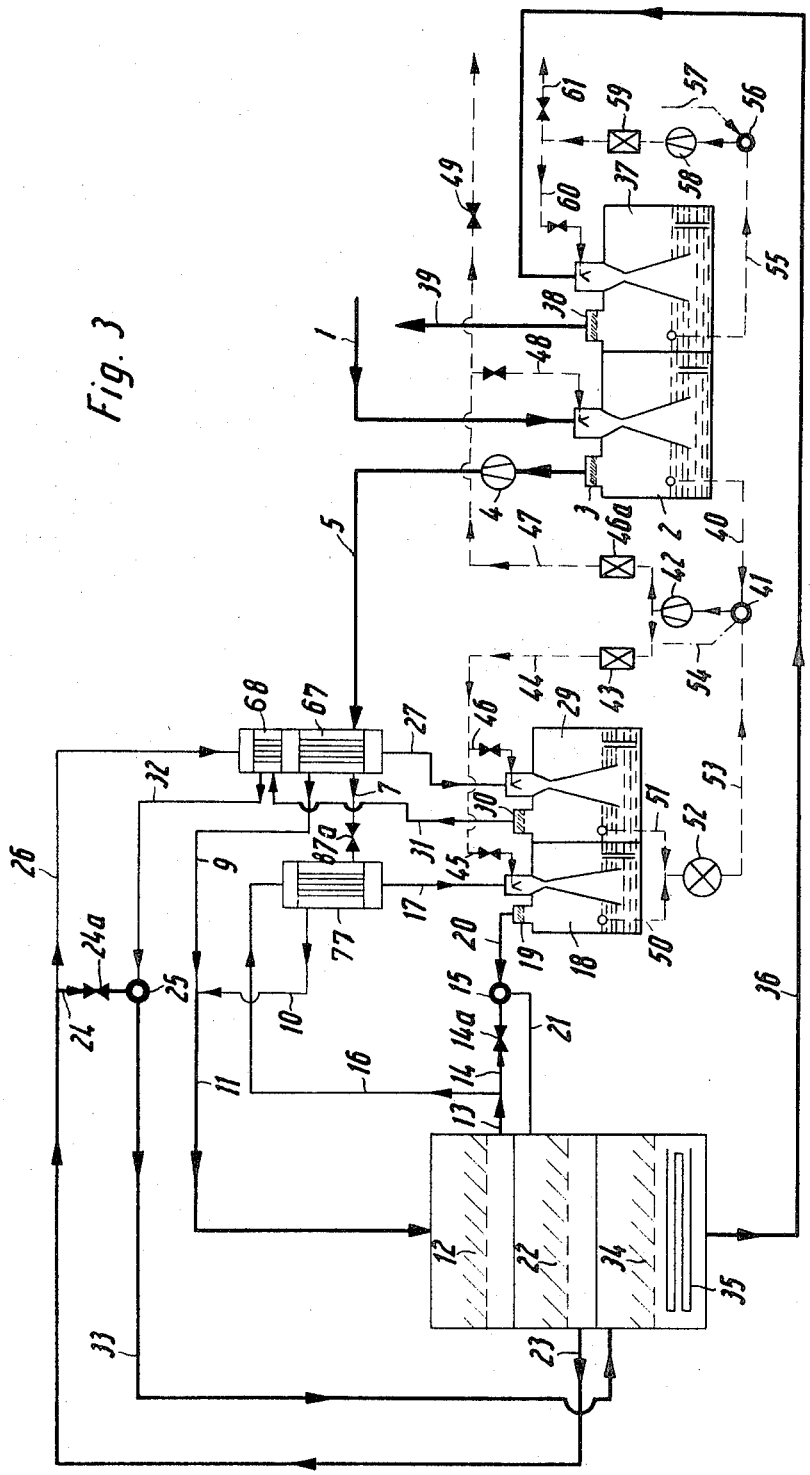

PROCESS FOR THE CATALYTIC CONVERSION OF SULFUR DIOXIDE TO SULFUR TRIOXIDE WITH PRODUCTION OF SULFURIC ACID

This application is a continuation of my earlier copending application, Ser. No. 686,249 filed Nov. 28, 1967 and now abandoned.

The invention relates to a process for the catalytic conversion of the $SO_2$ content of gases to $SO_3$ in contact installations which comprise a plurality of contacting trays and in which the resulting $SO_3$ content is partly absorbed by an interstage absorption treatment, to which part of the $SO_3$-containing gases transferred between the contacting trays is subjected to produce sulfuric acid.

In processes for a catalytic conversion of $SO_2$ to $SO_3$ with production of sulfuric acid, it is desired to obtain a high total conversion of $SO_2$ to $SO_3$ in dependence on the prevailing conditions and to obtain such a thermal efficiency that the process is thermally at least self-sufficient when gases from roasting are being processed and a maximum surplus of utilizable heat is obtained in the processing of sulfur combustion gases and, if possible, also of gases from roasting. It is further desired to accomplish these objects with means which are as economical as possible, e.g., a small amount of catalyst, small heat exchange surface areas and small absorbers.

Various processes are known in which the $SO_3$ content of the gases obtained after a contacting stage, which may consist of a desired number of contacting trays, is virtually completely removed by an interstage absorption treatment, and the gases are subsequently introduced into the next contacting stage and thereafter subjected to a final absorption treatment (Printed German applications Pat. Nos. 1,136,988; 1,139,818; 1,177,117; 1,181,680; 1,186,838.

Whereas these processes compare favorably to contact processes in which no interstage absorption treatment is carried out because they result in a higher total conversion of $SO_2$ to $SO_3$, they still require interstage heat exchangers having considerable heat exchange surface areas. Interstage heat exchangers are heat exchangers in which the gas which has been subjected to an interstage absorption treatment is reheated to the operating temperature of the next contacting tray.

A process has also been proposed in which an interstage absorption treatment is performed after a plurality of contacting stages. This process has not been successful in practice because it was uneconomical owing to the large requirement of extraneous heat (German Pat. No. 479,680).

In connection with a process using contacting tubes, it has already been proposed to branch off part of the $SO_3$-containing gases after the first contacting stage, to cool said branched-off gases and then to subject them to an interstage absorption treatment, and to admix said branched-off gases after the interstage absorption treatment with the starting gas before the same enters the first contacting stage. This process has various disadvantages. The $SO_2$ content of the starting gas is reduced. The $SO_3$-containing gas is not cooled after the first contacting stage and before it enters the second contacting stage. The second contacting stage must be disposed within the first contacting stage. An exact control of the temperature is not possible (German Pat. No. 749,145).

According to another proposal, about 50 percent of the $SO_3$-containing gases are branched off after the first contacting stage, which consists of a plurality of contacting trays, approximately 33 percent of the $SO_3$-containing gases are branched off after the second contacting stage, which also consists of a plurality of contacting trays, and both streams of branched-off gases are combined and introduced into an interstage absorber, where the $SO_3$ content is completely absorbed. Before the second and third contacting stage, gas at a rate which corresponds to that of the branched-off gas is supplied into the contacting stream from the interstage absorption stream. This process has the disadvantage that the gases which are branched off after the first and second contacting stages and which are mixed have different $SO_2$ contents so that a considerable amount of returned gas directly enters the third stage rather than the second stage. This fact probably gives rise to the need for a large number of contacting trays. Besides, it is difficult to match the rates at which the gases are withdrawn from and returned to the contacting stream. An interstage blower is required in the process and may result in condensation. Interstage heat exchangers are required in any case in this process (U.S. Pat. No. 1,789,460).

It is therefore an object of this invention to provide a novel process for the conversion of $SO_2$ to $SO_3$.

It is another object of this invention to provide a novel process for converting $SO_2$ to $SO_3$ which process is more economical than past processes.

It is a further object of this invention to provide an $SO_2$ to $SO_3$ conversion process coupled with interstage absorption to produce sulfuric acid, in which the capital and operating costs are reduced.

Other and additional objects will become apparent from a consideration of the entire specification including the drawing and claims hereof.

In accord with and fulfilling these objects, one aspect of this invention resides in a multitray $SO_2$ conversion furnace wherein the $SO_3$-containing gases discharged from the first tray are split prior to introduction thereof into the second tray with part of such split gases being passed through interstage absorption and cooling with the gases evolving from such absorption being rejoined to the remainder of the gas effluent from the first tray and thus combined are fed to the second tray.

According to the invention, the $SO_3$-containing gases discharged from the first contacting tray are transferred along a closed transfer path into the second contacting tray, part of the gases flowing along said transfer path is branched-off, cooled, subsequently subjected to an interstage absorption treatment, and thereafter remixed with the remaining gas flowing along said transfer path before entering the second contacting tray. The proportion, by volume, of the branched-off gas is controlled so that the heat content of the branched-off gas after the interstage absorption treatment and the heat content of the gas flowing along said transfer path without being subjected to an interstage absorption treatment are each such that upon mixing the two together the mixture has a temperature corresponding to the required inlet temperature of the second contacting tray.

The required inlet temperature of a contacting tray is defined as the temperature which the gases entering the tray must possess to maintain the catalyst in the tray at its operating temperature.

The proportion, by volume, of the branched-off gases to be subjected to interstage absorption treatment depends on the $SO_2$ content; on the $SO_2:O_2$ ratio of the starting gases; on the desired cummulative conversion of $SO_2$ to $SO_3$; on the operating temperature of the catalyst; and on the operating temperature of the interstage absorption treatment. At a substantially constant cumulative conversion, the volumetric proportion of the branched-off gas must be increased with an increase in the $SO_2$ content of the starting gas and with a decrease of the operating temperature of the interstage absorption treatment. The volumetric proportion of the branched-off gases can be reduced for a lower total conversion. The volumetric proportion of the branched-off gases is preferably about 40–60 percent of the total volume of the gases flowing along said transfer path.

When a cumulative conversion of about 98–98.5 percent is required, an interstage absorption treatment after the first contacting tray is sufficient.

If a cumulative conversion above about 98.8 percent is desired, the same technique is utilized, that is, the $SO_3$-containing gases discharged from the second contacting tray are transferred along a closed transfer path into a third contacting tray with part of the gas transferred from the second contacting tray to the third tray being split off, cooled, then subjected to an interstage absorption treatment and the exit gas therefrom thereafter mixed with the remaining gas transferred from the second contacting tray to the third tray before entering the third tray. The proportion, by volume, of the gas branched off after the second contacting tray is controlled in the same manner set forth above. The combined heat content of the exit gas from the interstage absorption treatment succeeding the second contacting tray and the heat content of the exit gas transferred from the second contacting tray to the third one without being subjected to an interstage absorption treatment are maintained such that when these two are mixed together, the resulting stream is at a temperature which corresponds to the required inlet temperature of the third contacting tray.

The proportion, by volume, of the branched-off gases supplied to the interstage absorber succeeding the second contacting tray, that is the second interstage absorber, is selected in accordance with the same principles as are used to specify the proportion of gases split from the stream after the first contacting tray. The proportion of said branched-off gases is preferably about 20–40 percent by volume of the volume of gases transferred from the second contacting tray to the third tray.

The interstage absorption treatment is preferably carried out at an elevated operating temperature of about 110°–220° C. This permits more gas to be subjected to interstage absorption treatment than with where the interstage absorption treatment is carried out at a lower temperature.

It is preferable to use a so-called Venturi-type recirculating and agitating absorber, wherein the $SO_3$-containing gas is introduced at the head of a vertically positioned Venturi tube. The gas is moistened in the Venturi tube with injected sulfuric acid. The gas which has passed through and been discharged from the Venturi tube is fed onto a bath of sulfuric acid, which bath takes up most of the liquid contained in the gas. The gas is upwardly deflected by the surface of the bath and passes through a gas-permeable plate. This plate is positioned above the surface of the bath, and is spaced therefrom. It surrounds the lower end of the Venturi tube and supports an agitated layer of sulfuric acid thereon, which is carried therethrough by the gases so that any residual $SO_3$ content thereof is absorbed. The bath at the bottom of the absorber communicates, through a riser, with the agitated layer of sulfuric acid on the gas-permeable plate. The agitated layer of sulfuric acid communicates with overflow means so that the surface of the bath of sulfuric acid below the plate and the surface of the sulfuric acid layer on the gas-permeable plate are maintained at substantially constant levels. The gas which has been freed from $SO_3$ is discharged from the upper part of the absorber housing.

When using three contacting trays and two interstage absorbers, the process according to this invention can be carried out with 80–110 liters of commercially available catalyst per metric ton of sulfuric acid monohydrate product per day.

If a very high cumulative conversion, in excess of about 99.3 percent is desired, an interstage heat exchanger having a small heat exchange surface area can be employed. In that case, the process is preferably carried out in such a manner that the $SO_3$-containing gases from the first contacting tray are treated as described hereinbefore and the $SO_3$-containing gases discharged from the second contacting tray are transferred along a closed transfer path into the third contacting tray. Part of the gas transferred from the second contacting tray to the third tray is branched off, cooled, then subjected to an interstage absorption treatment, and subsequently reheated in an interstage heat exchanger and mixed with the remaining gas transferred from the second contacting tray to the third tray before entering the latter. The heat required for heating the combined transferred gases to the required inlet temperature of the third contacting tray is supplied in the interstage heat exchanger. The volumetric proportion of the gas branched off downstream of the second contacting tray is selected in accordance with the above-mentioned principles. The proportion of the gas branched off after the second contacting tray may preferably amount to as much as 90 percent by volume of the gases flowing along said transfer path.

In an alternative embodiment, the proportion of gases branched off after the first contacting tray is up to about 90 percent by volume of the gases flowing along said transfer path, the branched-off gas is reheated in an interstage heat exchanger after the absorption treatment, the heat required for heating the combined transferred gases to the required inlet temperature of the second contacting tray is returned into said interstage heat exchanger, the $SO_3$-containing gases from the second contacting tray are transferred along a closed transfer path into the third contacting tray, part of the gas transferred from the second contacting tray to the third tray is split off, cooled, then subjected to an interstage absorption treatment and thereafter mixed with the remaining gas transferred from the second contacting tray to the third tray before entering the latter. The volumetric proportion of the gas branched off after the second contacting tray is selected so that the heat content of said gas after the absorption treatment and the heat content of the gas transferred from the second contacting tray to the third tray without being subjected to an absorption treatment are such that when these gases are mixed, the mixture has a temperature which corresponds to the required inlet temperature of the third contacting tray. The proportion of gas branched off after the second contacting tray is preferably 20–40 percent by volume of the gases transferred from the second contacting tray to the third tray.

In both modes of operation, the $SO_3$-containing gas to be subjected to the interstage absorption treatment is cooled by cold $SO_2$-containing gas if the latter gas is to be processed. The cold $SO_2$-containing gas is thus heated. If the $SO_2$-containing gas to be processed is initially at an elevated temperature, the gas to be subjected to the interstage absorption treatment is cooled by air or in waste heat boilers.

The process according to the invention has the advantage that interstage heat exchangers, which are heat exchangers in which the gas which has been subjected to an interstage absorption treatment is reheated to the required inlet temperature of the next contacting tray, may be entirely eliminated or may be quite small, having only small heat exchange surface areas, and then only if a very high total conversion of $SO_2$ to $SO_3$ is required. An additional advantage resides in the fact that, at most, only three contacting trays and correspondingly smaller amounts of catalyst are required.

The process according to the invention is suitable for a catalytic process carried out under super-atmospheric, sub-atmospheric, or atmospheric pressure.

The process according to the invention will now be described more fully with reference to the drawing and the examples.

In the drawing:

FIGS. 1, 2 and 3 are each schematic flow diagrams showing various embodiments of this invention.

The following examples, which are given by way of illustration and not limitation, are set forth together with reference to the drawing:

FIG. 1 and Example 1 relate to an application where a cumulative conversion of about 98–98.5 percent is required.

FIG. 2 and Example 2 relate to an application where a cumulative conversion above about 98.8 percent is required.

FIG. 3 and Example 3 relate to an application where a cumulative conversion above about 99.3 percent is required and an interstage heat exchanger having a small heat exchange surface area is employed.

EXAMPLE 1

The described plant has been designed for a conversion of sulfur combustion gases at an output of 100 metric tons sulfuric acid monohydrate per day and is illustrated in FIG. 1.

10,350 standard cubic meters of atmospheric air per hour, at 20° C. and a relative humidity of 80 percent, are drawn through a conduit 1 and a filter 2 into a dryer 3, where the air is dried with sulfuric acid having a concentration of about 96 percent by weight $H_2SO_4$ and a temperature of about 65° C.

The dried air is supplied at a temperature of 80°C. and under a pressure of 2,600 mm. of water through a drop seperator 4, a blower 5, a conduit 6 to a sulfur-burning furnace 7, into which 1,375 kg. of liquid sulfur are injected per hour through a conduit 8. The sulfur is burnt with the aid of the air which is at 80°C. Combustion gases, at a rate of 10,350 standard cubic meters per hour, are introduced into a waste heat boiler 10 through a conduit 9. These gases contain 9 percent by volume $SO_2$ and are at a temperature of 930° C. In the boiler 10, the gases are cooled to 450° C. and are then supplied to a first contacting tray 12 through conduit 11. The entire gas, at a rate of 10,014 standard cubic meters per hour, is discharged from the contacting tray 12 through a conduit 13 at a temperature of 635° C. after a conversion of 72 percent. Part of the partly converted gases, namely 4,014 standard cubic meters per hour or 40 percent of the total gas, is directly supplied into a mixer 15 through a conduit 14 provided with a regulating gate valve 14a without an absorption of the $SO_3$ which has been formed in the contacting tray 12. The remainder of the gas which has been partly converted in the contacting tray 12, namely 6,000 standard cubic meters per hour or 60 percent of the total gas, is supplied through a conduit 16 to a stream generator 17, which is provided with an economizer and in which the gas is cooled to 140° C. and from which the gas is supplied through a conduit 18 into an interstage absorber 19. The gas, which has been freed from $SO_3$, is discharged from the interstage absorber at a temperature of 200° C. and is passed through a drop separator 20 and a conduit 21 and admixed in the mixer 15 without preheating with the hot gases which have not been subjected to an absorption treatment. The gas mixture thus formed is passed through a conduit 22 into a second contacting tray 23. After the second conversion treatment, the gases are discharged from the contacting tray 23 through a conduit 24 at a rate of 9,492 standard cubic meters per hour and a temperature of 478° C. and after a total conversion of 97.0 percent. These gases are cooled in a steam generator 25 to about 400° C. and are conducted through a conduit 26 into a third contacting tray 27. The gas leaves the last contacting tray 27 at a temperature of 403° C. and after a total conversion of 98.3 percent. It is cooled in an economizer 28° to 140° C. and passed through a conduit 29 into a final absorber 30. The finally obtained gas freed of $SO_3$ leaves the plane through a drop separator 31 and a conduit 32 at a temperature of 100° C.

The dryer acid is withdrawn from the dryer 3 through a conduit 33 at a concentration of 96 percent $H_2SO_4$ and a temperature of 65°C. This acid is mixed in a mixing tank 34 with the highly concentrated acid, which is discharged at an elevated temperature from the interstage absorber 19 and has been pre-cooled. A pump 35 causes the acid to flow over an acid cooler 36 where it is cooled from 78° to 63° C., and is then supplied through conduits 37, 38, and 39 to the interstage absorber 19 and the dryer 3, where it is injected. The acid which is produced in the interstage absorber 19 is discharged through a conduit 40. The acid which has been strengthened in the interstage absorber 19 is discharged from the latter through a conduit 41, cooled to 100° C. in the feed water preheater 42 and conducted through a conduit 43 to the mixing tank 34. 255 kg./h. of diluting water are supplied through a conduit 44 into the tank 34 to adjust the concentration to 96percent by weight $H_2SO_4$.

In a second acid cycle, the acid which is discharged from the final absorber 30 through a conduit 45 is passed into a mixing tank 46, which is supplied with 520 kg./h. of diluting water through a conduit 52. The mixed fluid from the tank 46 is caused, by a pump 47, to flow over an acid cooler 48, where the acid is cooled to 51° C. The cooled acid is injected, through a conduit 50, into the final absorber 30. The remaining product is discharged through a conduit 51. Cooling the $SO_2$- and $SO_3$-containing gases in the stream generators and economizers 10, 17, 25, and 28 results in the production of 6,800 kg./h. saturated steam at 22 kg./sq.cm superatmospheric pressure. 6,800 kg./h. water are heated in the feed water preheater 42 from 20° to 77° C.

When cold, purified gases from roasting are employed, the steam generators 17 and 25 are replaced by heat exchangers in which the cold $SO_2$-containing gases are heated to the required inlet temperature of the first contacting tray 12.

EXAMPLE 2

The described plant was designed for a conversion of sulfur combustion gases with an output of 100 metric tons of sulfuric acid monohydrate per day and is shown in FIG. 2.

10,350 standard cubic meters of atmospheric air per hour, at 20° C. and a relative humidity of 80 percent, are drawn through a conduit 1 and a filter 2 into a dryer 3, where the air is dried with sulfuric acid having a concentration of 96 percent by weight $H_2SO_4$ and a temperature of 65° C.

The dried air is supplied at a temperature of 80° C. and under pressure of 2,600 mm. of water through a drop separator 4, a blower 5, a conduit 6 to an air preheater 77. The air which has been preheated to a temperature of 210° C. is supplied through a conduit 8 into a sulfur-burning furnace 7, into which 1,375 kg. liquid sulfur per hour are injected through a conduit 10 and burnt with the aid of the air, which is at 210° C. Combustion gases at a rate of 10,350 standard cubic meters per hour are introduced into a waste heat boiler 12 through a conduit 11. These gases contain 9 percent by volume $SO_2$ and are at a temperature of 1,030° C. In the boiler 12, the gases are cooled to 450° C. and are then supplied to a first contacting tray 14 through a conduit 13. The entire gas, at a rate of 10,014 standard cubic meters per hour, is discharged from the contacting tray 14 at a temperature of 635° C., after a conversion of 72 percent, through a conduit 15. A portion of the partly converted gases, namely, 4,014 standard cubic meters per hour or 40 percent of the gas, is directly supplied into a mixer 17 through a conduit 16, provided with a regulating gate valve 16a, without an absorption of the $SO_3$ which has been formed in the contacting tray 14. The remainder of the gas which has been partly converted in the contacting tray 14, namely, 6,000 standard cubic meters per hour or 60 percent of the gas, is supplied through a conduit 18 to a steam generator 19, which is provided with an economizer, in which the gas is cooled to 140° C. and from which the gas is supplied through a conduit 20 into a first interstage absorber 21. The gas, which has been freed from $SO_3$ is discharged from the first interstage absorber at a temperature of 200° C. and is passed through a drop separator 22 and a conduit 23 and is admixed in the mixer 17, without preheating, with the hot gases which have not been subjected to an absorption treatment. The gas mixture is passed through a conduit 24 into a second contacting tray 25. After the second conversion treatment, the gases are discharged from the contacting tray 25 through a conduit 26 at a rate of 9,492 standard cubic meters per hour and a temperature of 478° C. and after a total conversion of 97.0 percent.

A branch stream at a rate of 5,692 standard cubic meters per hour or 60 percent of the gas is supplied directly into a mixer 28 through a conduit 27 provided with a regulating gate valve 27a. The remaining gas, at a rate of 3,800 standard cubic meters per hour or 40 percent of the gas, is supplied through a conduit 29 to the air preheater 77, where the gas is cooled to 140° C., and is then supplied through a conduit 30 to a second interstage absorber 31. The gas, which has been freed from $SO_3$ and is discharged from the second interstage absorber at a temperature of 200° C., is passed through a drop separator 32 and a conduit 33, and is admixed in the mixer 28, also without preheating, with the hot gas which has not been subjected to an absorption treatment. This results in the mixed gas having a temperature of 377° C. The gas mixture is passed through a conduit 34 into a third contacting tray 35. The completely treated gas leaves the last contacting tray 35 at a temperature of 383° C. after a cumulative conversion of 99.2 percent. The exit gas is cooled in an economizer 36 to 140° C. and passed through a conduit 37 into a final absorber 38. The finally obtained gas, freed from $SO_3$, leaves the plant through a drop separator 39 and a conduit 40 at a temperature of 100° C.

The dryer acid is withdrawn from the dryer 3 through a conduit 41 at a concentration of 96 percent $H_2SO_4$ and a temperature of 65° C. and is mixed in a mixing tank 42 with the highly concentrated acid, which is discharged at an elevated temperature from the interstage absorbers 21 and 31 and has been pre-cooled. A pump 43 causes the acid to flow over an acid cooler 44 where it is cooled from 100° to 63° C., and is then supplied through conduits 45, 46, 47, and 48 to the interstage absorbers 21 and 31 and the dryer 3, where it is injected. The acid which is produced in the two interstage absorbers 21 and 31 is discharged through a conduit 49. The acid which has been strengthened in the interstage absorbers 21 and 31 is discharged from the latter through conduits 50 and 51, cooled to 140° C. in a feed water preheater 52 and conducted through a conduit 53 to the mixing tank 42. 455 kg./h. of diluting water are supplied through a conduit 54 into the tank 42 to adjust a concentration of sulfuric acid by 96 percent by weight.

In a second acid cycle, the acid which is discharged from the final absorber 38 through a conduit 55 is passed into a mixing tank 56, which is supplied with 320 kg./h. of diluting water through a conduit 57. The mixed fluid from tank 56 is caused, by a pump 58, to flow over an acid cooler 59, where the acid is cooled to 51° C. The cooled acid is injected through a conduit 60 into the final absorber 38. The remaining product is discharged through a conduit 61. Cooling the $SO_2$- and $SO_3$-containing gases in the steam generators and economizers 12, 19, and 36 results in the production of 7,150 kg./h. saturated steam at 22 kg./sq.cm. superatmospheric pressure. 7,150 kg./h. water are heated in the feed water preheater 52 from 20° to 77° C.

When cold, purified gases from roasting are employed, the steam generator 19 is replaced by a heat exchanger, which serves together with the preheater 77 for preheating the $SO_2$-containing gases to the required inlet temperature of the contacting tray.

EXAMPLE 3

The described plant has been designed for a conversion of gases from roasting at an output of 100 metric tons of sulfuric acid monohydrate per day and is shown in FIG. 3.

10,350 standard cubic meters of $SO_2$ gas per hour, at 40° C., are drawn through a conduit 1 into a dryer 2. These gases are saturated with water vapor, purified and demisted before being supplied to the dryer, in which they are dried by means of sulfuric acid having a concentration of 96.7 percent by weight $H_2SO_4$ and a temperature of 65° C.

The dried $SO_2$ gas is supplied at a temperature of 80° C. and under a pressure of 2,500 mm. of water to a heat exchanger 67 through a drop separator 3, a blower 4, and a conduit 5. Part of the $SO_2$ gas at a rate of 5,990 standard cubic meters per hour and a temperature of 120° C. is branched off through conduit 87, which contains a gate valve 87a. This branched-off gas is conducted in parallel to the heat exchanger 67 through a heat exchanger 77 for preheating the gas. The $SO_2$ gases which are preheated in the two heat exchangers are discharged from the latter through conduits 9 and 10, combined in a conduit 11 and enter a first contacting tray 12 at a temperature of 450° C. and with an $SO_2$ content of 9 percent by volume. The entire gas, at a rate of 10,050 standard cubic meters per hour, is discharged from the contacting tray 12, at a temperature of 635° C. and a conversion of 64 percent, through a conduit 13. A portion of the partly converted gases, namely, 4,550 standard cubic meters per hour or 45 percent of the gas, is directly supplied into a mixer 15 through a conduit 14 provided with a regulating gate valve 14a, without absorption of the $SO_3$ which has been formed in the contacting tray 12. The remainder of the gas, which has been partly converted in the contacting tray 12, namely, 5,500 standard cubic meters per hour or 55 percent of the gas, is supplied through a conduit 16 to the heat exchanger 77, in which the gas is cooled to 200° C. and from which the gas is supplied through a conduit 17 into a first interstage absorber 18. The gas, which has been freed from $SO_3$, is discharged from the first interstage absorber at a temperature of 200° C. and is passed through a drop separator 19 and a conduit 20 and is admixed in the mixer 15, without preheating, with the hot gases which have not been subjected to an absorption treatment. The gas mixture is passed through a conduit 21 into a second contacting tray 22. After the second conversion treatment, the gases are discharged from the contacting tray 22 through a conduit 23 at a rate of 9,584 standard cubic meters per hour, a temperature of 500° C., and after a conversion of 93.0 percent. A partial stream, at a rate of 1,984 standard cubic meters per hour or 20 percent of the gas, is directly supplied into the mixer 25 through a conduit 24 provided with a regulating gate valve 24a. The remaining gas, at a rate of 7,600 standard cubic meters per hour or 80 percent of the gas, is supplied through a conduit 26 to the heat exchangers 68 and 67, where it is cooled to 200° C. and from which it is supplied by a conduit 27 into a second interstage absorber 29. The gas, which has been freed from $SO_3$ and is discharged from the second interstage absorber at a temperature of 200° C., is passed through a drop separator 30 and a conduit 31 and is preheated in an interstage heat exchanger 68 to 330° C. The preheated gas is passed through a conduit 32 and admixed in the mixer 25 with the hot gas which has not been subjected to an absorption treatment. This mixing results in a gas having a temperature of 370° C. The gas mixture is passed through a conduit 33 into a third contacting tray 34. The completely treated gas leaves the last contacting tray 34 at a temperature of 388° C. and after a total conversion of 99.6 percent. It is cooled in an economizer 35° to 140° C. and passed through a conduit 36 into a final absorber 37. The finally obtained gas, freed from $SO_3$, leaves the plant through a drop separator 38 and a conduit 39 at a temperature of 100° C.

The dryer acid is withdrawn from the dryer 2 through a conduit 40 at a concentration of 96.7 percent $H_2SO_4$ and a temperature of 65° C. and is mixed in a mixing tank 41 with the highly concentrated acid, which is discharged at an elevated temperature from the interstage absorbers 18 and 29 and has been pre-cooled. A pump 42 causes the acid to flow over an acid cooler 43 where it is cooled from 83° to 65° C., and is then supplied through conduits 44, 45, and 46 to the interstage absorbers 18 and 29, where it is injected. A partial stream is caused to flow over an acid cooler 46a, where it is cooled from 83° to 49° C., and is then supplied through conduits 47 and 48 into the dryer 2, where it is injected. The acid which is produced in the two interstage absorbers 18 and 29 is discharged through a conduit 49. The acid, which has been strengthened in the interstage absorbers 18 and 29, is discharged from the latter through conduits 50 and 51, cooled to 150° C. in a feed water preheater 52 and conducted through a conduit 53 to the mixing tank 41. 176 kg./h. of diluting water are supplied through conduit 53 into the tank 41 to adjust the stream to a concentration of 96.7 percent by weight.

In a second acid cycle, the acid which is discharged from the final absorber 37 through conduit 55 is passed into a mixing tank 56, which is supplied with 170 kg./h. of diluting water through a conduit 57. The mixed fluid from tank 56 is caused, by a pump 58, to flow over an acid cooler 59, where the acid is cooled to 70° C. The cooled acid is injected through conduit 60 into the final absorber 37. The remaining product is discharged through conduit 61. 6,750 kg./h. of feed water are preheated from 103° to 255° C. in the economizer 35 for cooling the $SO_3$ gas. 6,750 kg./h. of water are preheated from 20° to 88° C. in the feed water preheater 52.

What is claimed is:

1. In a process for effecting a catalytic conversion of $SO_2$-containing gases with the aid of oxygen-containing gases to produce $SO_3$ with said conversion being carried out in a plurality of contacting trays and with the resulting $SO_3$ being removed from the gases by absorption in sulfuric acid at about 110° to 220° C, the improvement which comprises splitting the first $SO_3$-containing gas from a first contact tray into a first split stream and a first bypass stream; subjecting said first split stream to a first cooling and absorption in a first sulfuric acid absorber to produce additional sulfuric acid and a first effluent gas; forming a first combined gas stream of said first effluent gas and said first bypass stream; feeding said first combined gas stream to a second contact tray in which said first combined gas stream is converted to a second $SO_3$-containing gas; splitting said second $SO_3$-containing gas into a second split stream and a second bypass stream; subjecting said second split stream to a second cooling and absorption in second sulfuric acid to produce additional sulfuric acid and a second effluent gas; forming a second combined gas stream of said second effluent gas and said second bypass stream; feeding said second combined gas stream to a third contact tray in which said second combined gas stream is converted to a third $SO_3$-containing gas which is absorbed in third sulfuric acid to produce additional sulfuric acid.

2. The improved process claimed in claim 1 wherein the volume ratio of each split stream to each bypass stream, respectively, and the degree of cooling of said split stream are such that upon combining said bypass stream and said effluent gas stream, such combined gas stream is at a temperature corresponding to the required inlet temperature of the next contact tray.

3. The improved process as claimed in claim 1 wherein said first split stream is about 40 to 60 volume percent of said $SO_3$-containing gas.

4. The improved process claimed in claim 1 wherein said second split stream is about 20 to 40 volume percent of said $SO_3$-containing gas leaving said second contact tray.

5. The improved process claimed in claim 1 wherein said second gas effluent is heated prior to admixing such with said second bypass stream.

6. The improved process claimed in claim 5 wherein said heating of said second gas effluent is such that said admixture is at the required inlet temperature of said third contact tray.

7. The improved process claimed in claim 5 wherein said second split stream is up to about 90 volume percent of said $SO_3$-containing gas leaving said second contact tray.

8. The improved process claimed in claim 1 wherein said first split stream is up to about 90 percent by volume of said $SO_3$-containing gas and wherein said first gas effluent is heated prior to combining such with said first bypass stream.

9. The improved process claimed in claim 8 wherein the second split stream is about 20 to 90 percent by volume of the $SO_3$-containing gas leaving the first contact tray.

10. The improved process claimed in claim 1 wherein said absorption is carried out by passing each split stream downward through a Venturi tube, moisturizing said stream in said tube, impinging the effluent from said tube onto an aqueous sulfuric acid reservoir, absorbing a part of the $SO_3$ content of said effluent in said reservoir, reflecting a portion of said gas off the surface of said reservoir, and passing reflected gas through a gas permeable plate and through aqueous sulfuric acid on said plate.

* * * * *